United States Patent [19]

Faia

[11] Patent Number: 4,905,126
[45] Date of Patent: Feb. 27, 1990

[54] REFLECTOR TRUCK LIGHT

[76] Inventor: Joseph P. Faia, 9703 Lilac Ave., Garfield Hts., Ohio 44125

[21] Appl. No.: 248,793

[22] Filed: Sep. 23, 1988

[51] Int. Cl.⁴ .............................................. B60Q 1/26
[52] U.S. Cl. ..................................... 362/61; 362/147; 362/307; 362/812
[58] Field of Search ................. 362/61, 197, 267, 307, 362/308, 367, 368, 812, 80; 40/560, 590, 591, 624; 340/115

[56] References Cited

U.S. PATENT DOCUMENTS

| | | | |
|---|---|---|---|
| 1,390,561 | 9/1921 | Kelly | 362/812 |
| 1,416,467 | 5/1922 | Hobbs | 362/80 |
| 1,629,456 | 5/1927 | Pellegrini | 362/80 |
| 1,633,635 | 6/1927 | Harmon et al. | 40/591 |
| 1,961,865 | 6/1934 | Remington | 362/812 |
| 2,065,876 | 12/1936 | Siegfried | 240/8.2 |
| 2,193,063 | 3/1940 | Dettweiler | 240/8.2 |
| 2,238,728 | 4/1941 | Hadley et al. | 240/8.3 |
| 2,652,650 | 9/1953 | Helms et al. | 40/129 |
| 2,806,940 | 9/1957 | Worden | 240/52.1 |
| 3,005,089 | 10/1961 | Robbins | 240/7.1 |
| 3,161,356 | 12/1964 | Brenner | 40/560 |
| 3,191,019 | 6/1965 | Rijnders et al. | 362/225 |
| 3,251,985 | 5/1966 | Krupnick | 40/559 |
| 4,047,019 | 9/1977 | Nagel | 340/87 X |
| 4,118,764 | 10/1978 | Bleiweiss et al. | 362/61 |
| 4,216,525 | 8/1980 | Spiteri | 362/83 |
| 4,319,310 | 3/1982 | Kingsley | 362/812 |
| 4,477,864 | 10/1984 | Van Duyn et al. | 362/311 |
| 4,675,793 | 6/1987 | Capellari et al. | 362/267 |
| 4,692,847 | 9/1987 | Gandy | 362/249 |

Primary Examiner—Stephen F. Husar
Assistant Examiner—Richard R. Cole
Attorney, Agent, or Firm—Fay, Sharpe, Beall, Fagan, Minnich & McKee

[57] ABSTRACT

A system for illuminating two-dimensional displays on the sides of vehicle trailers includes a plurality of reflector light assemblies disposed about the perimeter of a side of a trailer. Each light assembly includes a base which is affixed to the side of the trailer and carries a light source. A housing formed of both a transparent section and semi-translucent sections is joined to the base and encloses the light source. The transparent housing section faces generally toward the center of the trailer side surface. A concave reflector in the housing together with lens portions in the transparent housing section act to focus light across the trailer side surface to illuminate the two-dimensional display thereon. A lesser quantity of light passes through the semi-translucent sections which are preferably tinted and arranged to function as the running lights commonly seen on trailers.

14 Claims, 4 Drawing Sheets

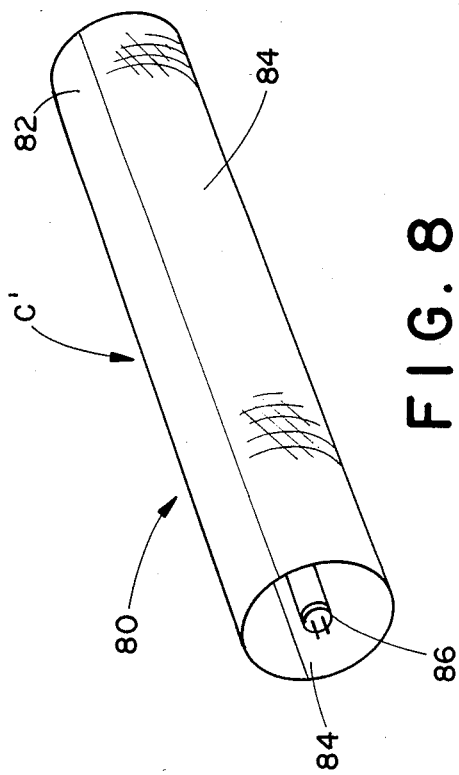

REFLECTOR TRUCK LIGHT

BACKGROUND OF THE INVENTION

This invention pertains to the art of illumination systems, and more particularly to a system for illuminating two-dimensional displays affixed to generally planar areas.

The invention is particularly applicable to illuminating two-dimensional displays of reflective or nonreflective media which may appear in the form of advertising or signs affixed to the sides of vehicles such as tractor-trailers, or affixed to other generally planar surfaces. Although the invention will be described with particular reference to this particular application, it may be advantageously employed in other environments and applications. The outer surfaces of many of today's trailers often bear a logo which advertises the owner or lessor of the trailer. Although such logos are readily seen during the day, they become substantially invisible at night. Thus they cannot serve their promotional purposes until daylight reappears. In order to allow such logos to be visible at night, it is, of course, necessary to illuminate them. However, illumination systems for such a purpose must be designed with the object of avoiding having bright light shine into the eyes of other drivers. Furthermore, it would be convenient if such an illumination systems were arranged so that the lights would be in unified combination with the logo-bearing trailer in order that detached or tractor mounted lights would not be necessary, and a variety of cabs or tractors could be used with the trailer.

For example, the Helms et al. U. S. Pat. No. 2,652,650, discloses an apparatus for displaying signs on trailers and shows an electric light that is mounted on the rear top of the tractor. The light generates and directs ultraviolet rays toward a sign positioned on the forward end of the trailer. Although the ultraviolet rays do not interfere with the vision of other drivers, the Helms et al. system has disadvantages. For one, it only provides for the illumination of signs on the forward end of the trailer and does not illuminate those signs which appear along the sides of the trailers. Second, the system's flexibility is limited in that a specific tractor is required for illuminating the sign. That is, the tractor used must have the necessary ultraviolet light, for without the light the sign would not be illuminated and would be, therefore, invisible at night.

The present invention contemplates a new and improved arrangement which overcomes the above described problems, and provides a system for illuminating two-dimensional displays affixed to the sides of trailers. The system of the invention causes light from a reflector light assembly to shine along the planar area of the two-dimensional design so as not to interfere with the vision of other drivers. Further, the reflector light assemblies used by the system are incorporated onto a perimeter of the side of the trailer with the object of forming a single overall unit for displaying advertising media. Finally, the system of the preferred embodiment functions to provide running lights in addition to providing the desired planar surface illumination.

BRIEF DESCRIPTION OF THE INVENTION

In accordance with the present invention, there is provided a system for illuminating logos or advertising affixed to the sides of vehicles such as tractor-trailers. Of course, the system could be used to illuminate two-dimensional displays found on other vehicles such as buses or taxis, or on other generally planar areas. The system includes light assembly means positioned along the perimeter of the side of a trailer to perform two functions. First, the means illuminates two-dimensional designs affixed to the sides of the trailer without shining light into the eyes of passers-by. Second, the means provides the trailer with running lights of the type which are commonly seen on such vehicles.

In accordance with a more limited aspect of the invention, there is provided a collection of reflector light assemblies which are affixed along a perimeter of the side of a trailer. These reflector light assemblies include a base which carries a reflecting means and a light source enclosed by a housing. The reflecting means is arranged to direct light toward and beyond the light source so that most of the light emitted by he source is directed in one general direction along the trailer surface. Further, the housing includes semi-translucent sections and is attached to the base at a circular groove within the side surface and sealed therein by a gasket means. A large portion of the cover is tinted so that it both passes light emitted by the source as well as reflects light which comes to it from outside. The tinted portion is essentially seen as a running light of the type which is typically found on many tractor-trailers or buses. Additionally, the tinted portion can act as a backing light or parking light in connection with the vehicle to which it is affixed.

Another portion of the housing is a colorless transparent section which is positioned to generally face the center of the side of the trailer. The transparent section has within it a clear convex lens that acts in conjunction with the reflecting means to focus the light in a direction along the side of the trailer. Thus, as the trailer moves down the street, it acts as an illuminated, moving billboard, but does not shine blinding light into the eyes of others.

In some instances, the portion of the housing that is not colorless is semi-opaque or opaque. In such an instance, all or most of the light emitted by the light source is directed to pass through the transparent section of the housing.

In accordance with a second embodiment of the present invention, the apparatus for illuminating information or advertising displays affixed to the sides of trailers is disposed only along a bottom edge of the side of the trailer. The apparatus comprises a series of tubes with a light source positioned within each tube. A first portion of the circumference of each tube is clear and a second portion is fitted with semi-opaque reflective material. The semi-opaque reflective area limits the amount of light being projected away from the trailer and instead reflects light back toward and beyond the light source through the clear portion of the tube and upwardly along the wall of the trailer. A portion of the source light also shines through the semi-opaque area so that the tubes can act as running lights.

As is apparent, a primary advantage of the invention is that advertising and other two-dimensional displays affixed to the sides of trailers can be illuminated in such a way as not to shine bright lights directly into the eyes of others on the road.

Another advantage of the present invention is that the reflector light assemblies are affixed directly onto the trailer so that they will stay with the trailer as it is moved about, and no other equipment (such as a cab or tractor for mounting the reflector light) will be required in order to illuminate the trailer.

Yet another advantage of the present invention is that the reflector lights serve a dual purpose in that they both illuminate the sides of trailers and function as running, parking or backing lights.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 8 is a perspective view of an alternate embodiment of the subject invention.

DETAILED DESCRIPTION OF THE PREFERRED EMBODIMENT

Figure 1:
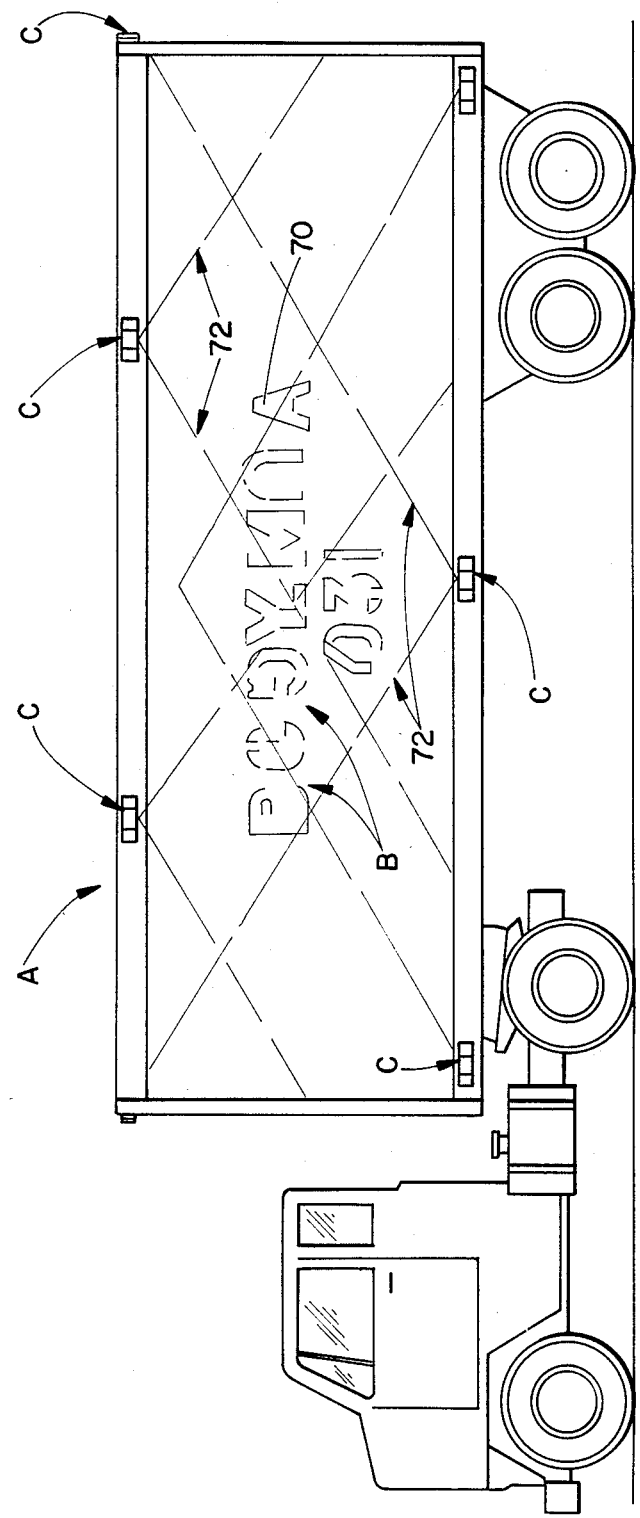
FIG. 1 is an elevational view of the side of a tractor and a logo-bearing trailer having a plurality of reflector lights arranged along the perimeter thereof.

Referring now to the drawings wherein the showings are for purposes of illustrating the preferred embodiment of the invention only and not for purposes of limiting same, FIGS. 1-7 show a typical tractor and an associated trailer A which has affixed to it a logo B as well as a number of reflector lights C which both illuminate the logos and act as running lights.

Figure 2:
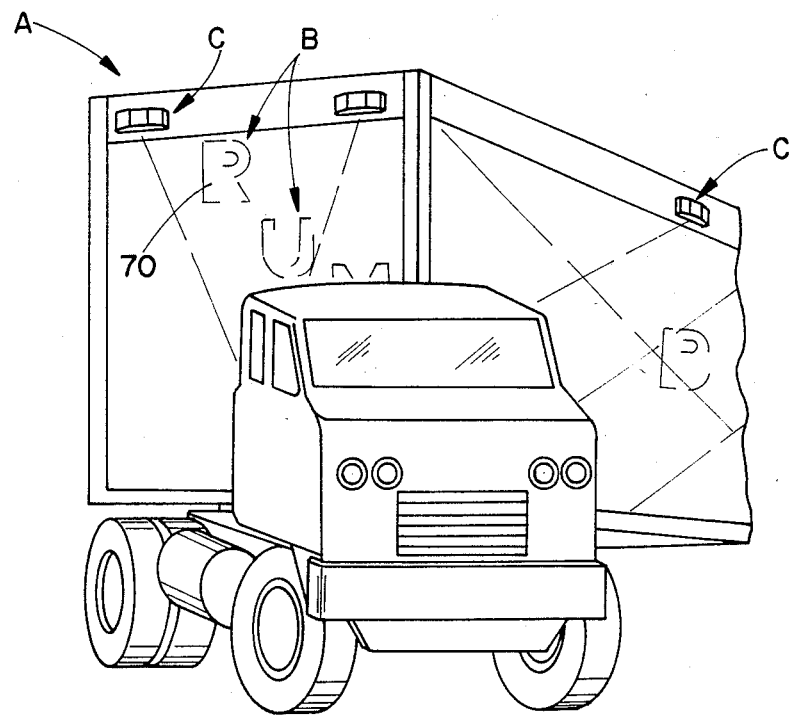
FIG. 2 is a perspective illustration showing the illumination of a logo on the forward surface of a trailer.
Figure 3:
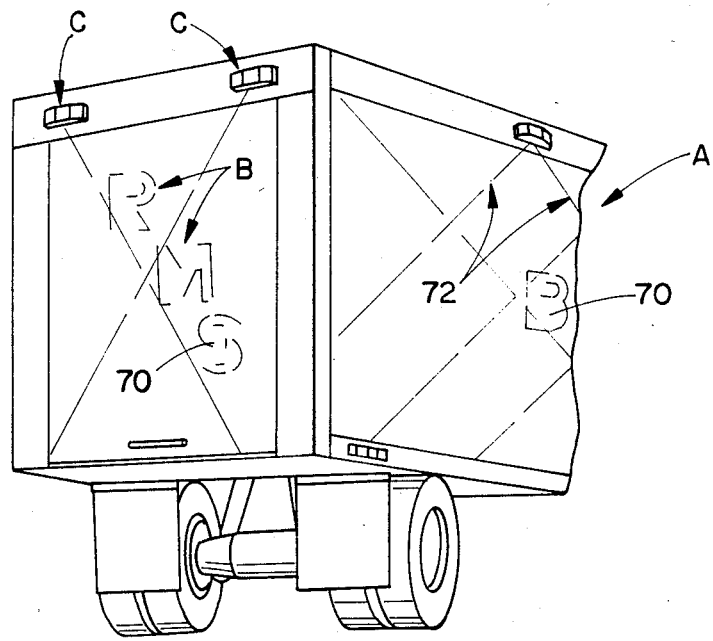
FIG. 3 is a perspective illustration showing the illumination of a logo on the rear surface of a trailer.

With particular reference to FIGS. 1-3, the drawings show a vehicle trailer A having upon its side, forward, and rearward surfaces a logo B which is two dimensional and formed by pigmented media 70. This pigmented media 70 can be reflective or non-reflective, fluorescent or non-fluorescent. As will further be noted with respect to the figures, a number of reflector light assemblies C are spaced along a perimeter of the trailer side, forward and rearward surfaces. It is possible to provide a single reflector light assembly C in connection with surfaces whose sizes are small enough to warrant a single light assembly. In addition, the assemblies could also be placed at a central location of a planar surface rather than only along the perimeter.

The reflector light assemblies C are arranged to direct light in a fan-like pattern 72 along the surfaces of the trailer. They also function as running lights commonly seen on many trailers and buses, and can further act as parking or backing lights.

Figure 6:
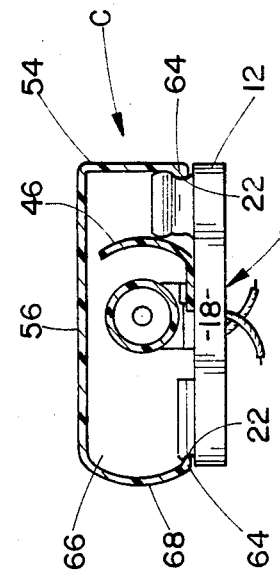
FIG. 6 is a cross-sectional view along line 6-6 of FIG. 4.
Figure 4:
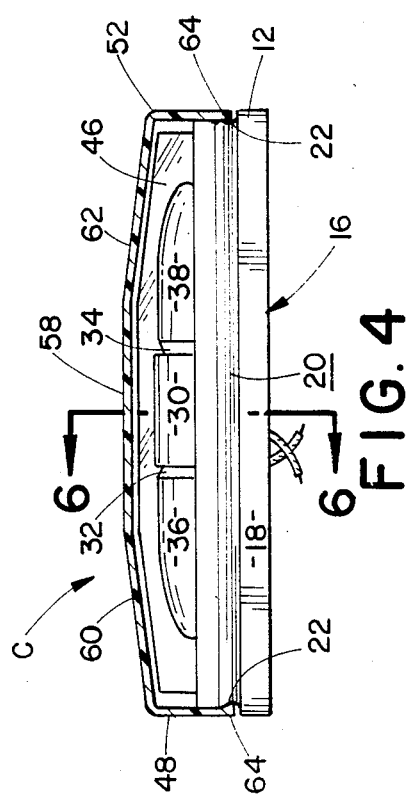
FIG. 4 is a side elevational view of a reflector light with a portion partially cut away for convenience of illustration.

More particularly and with reference to FIGS. 4 and 6, in which certain showings are schematic in nature to merely allow an appreciation of the environment involved, reflector light assemblies C include a metal base 12 having an inner surface 14, an outer surface 16, and a side surface 18. The side surface 18 includes within it a circular groove 20 which receives a gasket means 22.

A fixture 30 is rigidly affixed on the inner surface 14 of the metal base 12. Extending outwardly from either side of the fixture 30 are the first socket means 32 and the second socket means 34. First and second light sources, such as halogen bulbs 36 and 38, are received into the first and second socket means, respectively. Fluorescent lamps can also be used as light sources.

As can be seen in FIGS. 4 and 6, a concave reflecting means 46 is mounted on the inner surface 14 of the metal base 12 to the rear of the light sources 36 and 38. The concave reflecting means 46 is formed of polished metal in the preferred embodiment and extends slightly upwardly beyond the level of the light sources and reflects light emitted by the sources back toward and beyond the sources.

Figure 7:
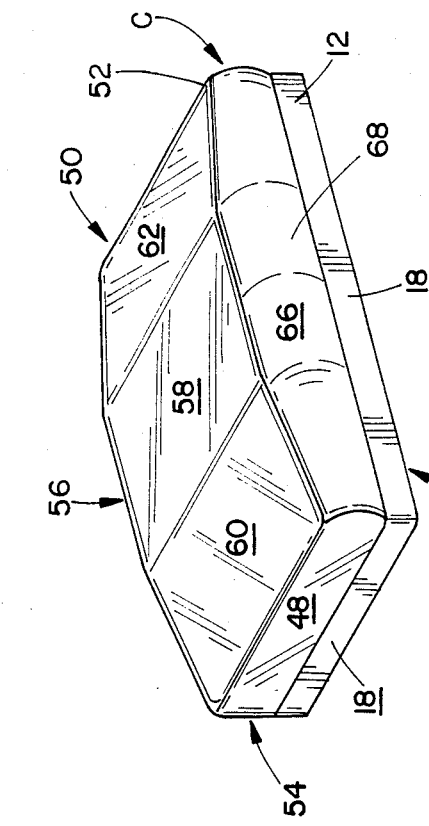
FIG. 7 is a perspective view of a reflector light.

FIG. 7 shows a housing 50 having a pair of opposing semi-translucent side faces 48 and 52 which project upwardly from the side surface 18 of the base. A three-section semi-translucent face 56 interconnects with the pair of opposing side faces 48 and 52. A midsection 58 of the face 56 is parallel to the base 12 and is directly above the fixture 30. A first end section 60 of the face 56 slopes downwardly from the midsection 58 to meet a first side face 48. A second end section 62 of the face 56 slopes downwardly to join a second side face 52. A rear semi-translucent face 54 is shown in FIG. 6. A transparent side wall section 66 makes up the final face of the housing 50. This side wall section 66 includes a clear convex lens 68 which directs and focuses light in a fan-like pattern 72 along the generally planar surface of the trailer A.

As will be noted in FIGS. 4 and 6, the vertically situated semi-translucent faces 48, 52 and 54, and the transparent side wall section 66 include bulbous portions 64 which fit snugly within the gasket means 22 of the circular groove 20. As would be obvious to one skilled in the art, such sealing could also be accomplished by o-rings or other sealing means.

Figure 5:
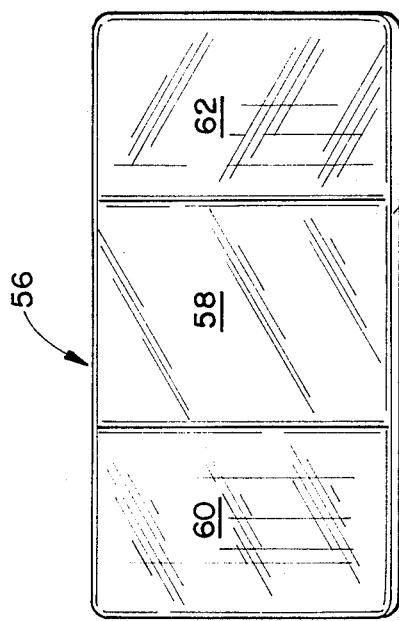
FIG. 5 is a top plan view of a reflector light.

Finally, drawing attention to FIGS. 5 and 7, the semi-translucent side faces 48, 52, and sections 58, 60 and 62 are preferably tinted with red or amber. Thus, when they are affixed to a trailer as in FIGS. 1-3, the tinted portion of the reflector lights appear as running lights commonly seen on such trailers. These tinted portions can also act as parking or backing lights.

According to an alternative embodiment of the subject invention, a cylindrical tube can be used to house the light source. For ease of illustration, like elements are identified by like numerals with a primed (') suffix and new elements are identified by new numerals.

An alternate embodiment of the reflector light C' is shown in FIG. 8. In this drawing, a tube 80 is shown. A first portion 82 of the tube circumference is clear, and a second portion 84 of the tube circumference is fitted with a reflective semi-opaque material. A light source 86 is located inside the tube. The tube 80 is positioned along the bottom edge of the planar surface and shines light upwardly to illuminate the logo without shining light outwardly. A greatly reduced level of light passes outwardly through the semi-opaque portions of the tube to allow the tubes to appear as running lights.

The invention has been described with reference to both the preferred embodiment and a second embodiment. Obviously, modifications and alterations will occur to others upon the reading and understanding of this specification. It is my intention to include all such modifications and alterations insofar as they come within the scope of the appended claims or the equivalent thereof.

What is claimed is:

1. An apparatus for illuminating media affixed or applied to a generally planar area in the form of a side of a truck trailer comprising: a plurality of reflector light assemblies that are disposed about the area, each reflector light assembly including:
    a base rigidly affixed to the generally planar area;
    a light source rigidly affixed to the base;
    a reflecting means affixed to the base, the reflecting means having at least one reflecting surface to reflect light transmitted by the source over the planar area; and,
    a housing enclosing said light source and said reflecting means, said housing having a transparent portion and a tinted semi-translucent portion, said transparent portion positioned to permit light from said source to pass over said truck trailer planar area and said tinted portion positioned to face away from said planar area, the reflecting means substantially removed from the housing.

2. The apparatus of claim 1 wherein the media affixed to the generally planar surface are pigmented materials positioned so as to create a two-dimensional display.

3. The apparatus of claim 1 wherein the generally planar area is generally vertical in position.

4. The apparatus of claim 1 wherein the light source is a fluorescent lamp.

5. The apparatus of claim 1 wherein the light source is a halogen lamp.

6. The apparatus of claim 1 wherein the reflecting means is concave in shape.

7. The apparatus of claim 1 wherein the transparent housing portion of the cover has within it a convex lens which is positioned to cause the light passed through the lens to be focused in a narrow pattern along the generally planar area.

8. A system for illuminating the sides of vehicle trailers or other generally planar surfaces comprising: a plurality of reflector light assemblies disposed about the perimeter of a side of the trailer, each light assembly including:
    a base having an inner planar surface and an outer planar surface, the outer planar surface rigidly affixed to the side of the trailer, the base further including a side surface interconnecting the inner planar surface and the outer planar surface, the side surface extending generally around the perimeter of the metal base and having a circular groove for receiving a gasket means;
    a fixture rigidly affixed to the inner planar surface of the base, the fixture having a first socket means and a second socket means respectively receiving first and second bulbs, the socket means positioned to permit receipt of the bulbs substantially above the side surface of the base;
    a housing having a pair of opposing semi-translucent end faces and a semi-transparent rear face, each face projecting upwardly from the side surface of the base and extending upwardly beyond the level of the fixture to cooperate with a semi-translucent top face which is generally parallel to the base;
    said housing further including a transparent face projecting upwardly from the side surface of the base and sitting generally parallel to said rear face, said transparent face including a clear convex lens for focusing light emitted by the bulbs and by the reflecting means in a fan-like manner along the surface of the trailer; and,
    a reflecting means substantially removed from the housing, the reflecting means affixed to the base and having at least one reflecting surface facing toward the socket means to reflect light transmitted by the bulbs toward and beyond the fixture.

9. The system of claim 8 wherein the trailer has pigmented media on the side thereof in a two-dimensional display.

10. The system of claim 8 wherein the reflecting means is formed from metal and is concave in shape.

11. The system of claim 8 wherein the semi-translucent cover is made of a colored plastic which allows light to pass therethrough to act as a running light visible to passers-by.

12. The system of claim 8 wherein the semi-translucent top face is divided into three sections, a central section which is parallel to the metal base, a first end section angled slightly downwardly away from the central section to operatively connect with one semi-translucent end face projecting upwardly from the side surface, and a second end section angled slightly downwardly away from the central section to operatively connect with the other semi-translucent end face projecting upwardly from the side surface.

13. The system of claim 8 wherein the transparent face of the housing is made of plastic and is positioned perpendicularly to the side of the trailer to permit light from the bulbs and the reflecting mean to pass therethrough along the surface of the trailer.

14. An apparatus for illuminating pigmented media affixed to a generally planar side of a vehicle trailer comprising: a plurality of reflector light assemblies disposed along an edge of the planar side, each reflector light assembly including:
    a light source;
    a curved reflecting means having at least one reflecting surface situated toward the light source to reflect light transmitted by the source toward and beyond the source;
    a housing overlying said light source and said reflecting means, said housing having a portion facing said planar side which is transparent to allow light from the source as well as light reflected off of the reflecting means to be transmitted therethrough and along the planar side to illuminate the pigmented media, said housing further having tinted semi-translucent portions facing away from said planar surface to act as running lights for said vehicle trailer, the area between the light source and the transparent portion of the housing substantially unobstructed.

* * * * *